(12) United States Patent
Audouard et al.

(10) Patent No.: US 12,643,179 B2
(45) Date of Patent: Jun. 2, 2026

(54) METHOD FOR DETERMINING THE OPERATIONAL CONDITIONS OF A METHOD FOR HIGH-REPETITION RATE FEMTOSECOND LASER ABLATION FOR A GIVEN MATERIAL AND METHOD FOR LASER WELDING BETWEEN PARTS OF A DETERMINED MATERIAL

(71) Applicants: AMPLITUDE, Pessac (FR); CENTRE NATIONAL DE LA RECHERCHE SCIENTIFIQUE, Paris (FR); UNIVERSITE DE BORDEAUX, Bordeaux (FR)

(72) Inventors: Eric Audouard, Solignac-sous-Roche (FR); Guillaume Bonamis, Talence (FR); Konstantin Mishchick, Bordeaux (FR); Clemens Honninger, Cestas (FR); John Lopez, Gradignan (FR); Inka Manek-Honninger, Cestas (FR); Eric Mottay, Begles (FR)

(73) Assignees: AMPLITUDE, Pessac (FR); CENTRE NATIONAL DE LA RECHERCHE SCIENTIFIQUE, Paris (FR); UNIVERSITE DE BORDEAUX, Bordeaux (FR)

( * ) Notice: Subject to any disclaimer, the term of this patent is extended or adjusted under 35 U.S.C. 154(b) by 1134 days.

(21) Appl. No.: 17/428,754

(22) PCT Filed: Feb. 6, 2020

(86) PCT No.: PCT/FR2020/050213
§ 371 (c)(1),
(2) Date: Aug. 5, 2021

(87) PCT Pub. No.: WO2020/161445
PCT Pub. Date: Aug. 13, 2020

(65) Prior Publication Data
US 2022/0072663 A1 Mar. 10, 2022

(30) Foreign Application Priority Data

Feb. 6, 2019 (FR) ....................................... 1901188

(51) Int. Cl.
B23K 26/0622 (2014.01)
B23K 26/352 (2014.01)
(Continued)

(52) U.S. Cl.
CPC .......... *B23K 26/40* (2013.01); *B23K 26/0624* (2015.10); *B23K 26/355* (2018.08); *B23K 26/362* (2013.01)

(58) Field of Classification Search
CPC .. B23K 26/40; B23K 26/0624; B23K 26/355; B23K 26/362; B23K 26/0006
See application file for complete search history.

(56) References Cited

U.S. PATENT DOCUMENTS 5,539,175 A * 7/1996 Smith .................. B23K 26/384
219/121.73
2008/0296273 A1 12/2008 Lei et al.
(Continued)

OTHER PUBLICATIONS

Elahi et al., "High-power Yb-based all-fiber laser delivering 300 fs pulses for high-speed ablation-cooled material removal", Optic Letters, vol. 43, No. 3, Feb. 1, 2018, pp. 535-538. (Year: 2018).*
(Continued)

*Primary Examiner* — Tiffany T Tran
(74) *Attorney, Agent, or Firm* — NIXON & VANDERHYE

(57) ABSTRACT

Disclosed is a method for determining the operational conditions of a method for high-repetition rate femtosecond laser ablation including a first step of determining a set of parameters of a burst of laser pulses adapted to generate an ablation crater in the material, the set of parameters including an intra-burst repetition frequency f between several
(Continued)

Figure 1:
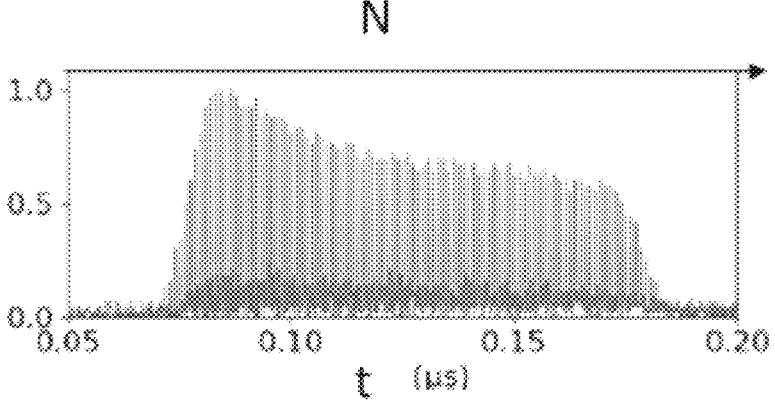

hundred MHz and 100 GHz, a number N of pulses of the burst of laser pulses equal to a number Nc of heating and ablation pulses, with Nc being defined by the equation $Nc=(L^2 \cdot f)/D$, where L represents a test depth and D represents a thermal diffusion coefficient of the material to be ablated, with Nc being greater than or equal to 10, a characteristic total fluence FTchar of the burst of pulses and a characteristic fluence per pulse Fchar=FTchar/Nc below an ablation threshold fluence Fs1 of the material by a single laser pulse.

11 Claims, 3 Drawing Sheets

(51) Int. Cl.
B23K 26/362      (2014.01)
B23K 26/40      (2014.01)

(56) References Cited

U.S. PATENT DOCUMENTS

| | | | |
|---|---|---|---|
| 2011/0045244 A1* | 2/2011 | Mazur | H01L 21/268 |
| | | | 428/141 |
| 2012/0187860 A1 | 7/2012 | Jacob et al. | |
| 2013/0008880 A1* | 1/2013 | Ota | B23K 26/0652 |
| | | | 219/121.64 |
| 2015/0232369 A1* | 8/2015 | Marjanovic | B23K 26/0622 |
| | | | 428/221 |
| 2016/0200621 A1* | 7/2016 | N'Gom | B23K 26/53 |
| | | | 65/355 |
| 2017/0129054 A1* | 5/2017 | Dittli | B23K 26/352 |
| 2018/0154572 A1 | 6/2018 | Richter et al. | |

OTHER PUBLICATIONS

Kerse et al., "Ablation-cooled material removal with ultrafast bursts of pulses", Nature, vol. 537, Jul. 13, 2016, pp. 1-6. (Year: 2016).*
Matsumoto et al., "Ultrafast laser ablation of copper with ~GHz bursts", Proc. of SPIE, vol. 10519, Feb. 16, 2018, pp. 1051902-1-1051902-11. (Year: 2018).*
Jaeggi et al., "Influence of the pulse duration and the experimental approach onto the specific removal rate for ultra-short-pulses", Proc. of SPIE, vol. 10091, Feb. 20, 2017, pp. 100910J-1-100910J-10. (Year: 2016).*
Office Action, issued in Chinese Patent Application No. 202080026154.1 dated Jan. 30, 2024.
International Search Report for PCT/FR2020/050213 dated Jun. 12, 2020, 6 pages.
Written Opinion of the ISA for PCT/FR2020/050213 dated Jun. 12, 2020, 6 pages.
Elahi et al., "High-power Yb-based all-fiber laser delivering 300 fs pulses for high-speed ablation-cooled material removal", Optic Letters, vol. 43, No. 3, Feb. 1, 2018, pp. 535-538.
Jaeggi et al., "Influence of the pulse duration and the experimental approach onto the specific removal rate for ultra-short-pulses", Proc. of SPIE, vol. 10091, Feb. 20, 2017, pp. 100910J-1-100910J-10.
Kerse et al., "Ablation-cooled material removal with ultrafast bursts of pulses", Nature, vol. 537, Jul. 13, 2016, pp. 1-6.
Matsumoto et al., "Ultrafast laser ablation of copper with ~GHz bursts", Proc. of SPIE, vol. 10519, Feb. 16, 2018, pp. 1051902-1-1051902-11.
Office Action, issued in European Patent Application No. 20706798.4 dated Aug. 15, 2024.

* cited by examiner

METHOD FOR DETERMINING THE OPERATIONAL CONDITIONS OF A METHOD FOR HIGH-REPETITION RATE FEMTOSECOND LASER ABLATION FOR A GIVEN MATERIAL AND METHOD FOR LASER WELDING BETWEEN PARTS OF A DETERMINED MATERIAL

CROSS-REFERENCE TO RELATED APPLICATIONS

This application is the U.S. national phase of International Application No. PCT/FR2020/050213 filed Feb. 6, 2020 which designated the U.S. and claims priority to French Application No. 1901188 filed Feb. 6, 2019, the entire contents of each of which are hereby incorporated by reference.

The present invention relates generally to the field of laser ablation and welding methods.

It relates more particularly to the field of methods of laser ablation of a surface of a material by a burst of laser pulses or a succession of bursts of laser pulses at high-repetition rate, of the order of GHz.

The surface ablation of a material by a microsecond, nanosecond, picosecond or femtosecond laser pulse is today a technique widely used to modify the surface of a material in a controlled manner (drilling, cutting, structuring). The materials involved are varied and are for example semiconductor, metallic, dielectric materials or else biological tissues.

Femtosecond pulses usually lead to the best workmanship, but the ablation efficiency of these pulses is also lower than for longer pulses of the order of nanosecond. The recent possibility of having a laser with a higher average power allows to use higher repetition rates around the MHz to reduce production times. However, the use of these high repetition rates of the pulses delivered by the laser can generate an unwanted thermal accumulation phenomenon. This unwanted thermal accumulation phenomenon degrades the ablation quality of the material. It is therefore essential to develop alternative methods intended to improve the quality of the surface ablation of a given material.

In some particular cases, it has recently been shown in the scientific literature that a high-repetition rate of femtosecond laser pulses (greater than ten MHz and around 1 GHz) can allow a significant increase in the ablation efficiency. In this case, the number of operating parameters is very high: the wavelength of the laser, the repetition rate of the pulses delivered by the laser, the duration of the pulses, the energy of the pulses, the focusing, the average power of the pulses, the material to be ablated . . . . This large number of operating parameters makes it difficult to determine the operating parameters most adapted to a given material. In addition, the exact nature of the mechanisms of laser ablation of a material by bursts of femtosecond pulses at GHz repetition rate is still controversial in the scientific literature.

According to the prior art, ablation at the surface of a material occurs when the fluence of the laser pulse(s) is equal to an ablation threshold determined for each material.

The invention also relates to a high-repetition rate laser welding method without loss of material.

Provision is thus made according to the invention, of a method for determining the operational conditions of a method for high-repetition rate femtosecond laser ablation for a given material comprising a first step of determining a set of parameters of a burst of laser pulses adapted to generate an ablation crater in the material, the set of parameters consisting of an intra-burst repetition frequency f comprised between several hundred MHz and 100 GHz, a number N of pulses of the burst of laser pulses greater than or equal to 10, a characteristic total fluence $FT_{char}$ of the burst of pulses and a characteristic fluence per pulse below an ablation threshold fluence Fs1 of the material by a single laser pulse.

Advantageously, the number N of pulses of the burst of laser pulses is greater than or equal to a number Nc of heating and ablation pulses, with Nc being defined by the equation $Nc=(L^2 \cdot f)/D$, where L represents a test depth and D represents a thermal diffusion coefficient of the material to be ablated, with Nc being greater than or equal to 10, and where the characteristic fluence per pulse is equal to $F_{char}=FT_{char}/Nc$.

The invention also relates to a method of laser ablation of a determined material comprising the application of a burst of femtosecond laser pulses at an intra-burst repetition frequency f comprised between several hundred MHz and 100 GHz, the burst of femtosecond laser pulses comprising a number N of pulses greater than or equal to a number Nc of heating and ablation pulses, with Nc being defined by the equation $Nc=(L^2 \cdot f)/D$, where L represents a depth of ablation in the material and D represents a thermal diffusion coefficient of the material to be ablated, with Nc being greater than or equal to 10, the burst of femtosecond laser pulses having a total fluence greater than or equal to a characteristic total fluence $FT_{char}$ adapted to generate an ablation crater in the material and each pulse of the burst having a fluence greater than or equal to a characteristic fluence per pulse defined by the ratio between the characteristic total fluence $FT_{char}$ and the number Nc of heating and ablation pulses ($F_{char}=FT_{char}/Nc$), the characteristic fluence per pulse being below an ablation threshold fluence Fs1 of the material by a single laser pulse adapted to ablate the material, said single laser pulse adapted to ablate the material having the same spatial, spectral and temporal properties as a pulse of said burst.

A preliminary step of the laser ablation method can consist in sending a burst of femtosecond light pulses to the surface of a material at the repetition rate of the pulses delivered by the laser to determine experimentally a characteristic total fluence $FT_{char}$ defined by the absence of an ablation crater if $FT<FT_{char}$ and the presence of an ablation crater for $FT=FT_{char}$. This is typically a threshold fluence for the femtosecond pulse burst ablation method of repetition rate f and pulse number Nc.

According to the ablation method, the ablation depth obtained is close to the value of the test depth L for $FT=FT_{char}$ and N=Nc.

According to particular and interesting aspects of the invention:

the method comprises an experimental determination of the value of the characteristic total fluence $FT_{char}$ of the burst for the number of pulses Nc, $FT_{char}$ being the minimum total fluence for obtaining a crater at the surface of the material;

the method comprises a second step of determining an operational total fluence $FT_{opt}$ for a burst of laser pulses comprising Nc laser pulses;

the operational total fluence $FT_{opt}$ is comprised between 2 times the characteristic total fluence $FT_{char}$ and 6 times the characteristic total fluence $FT_{char}$;

the method comprises a third step of determining a number N of pulses of the burst to ablate the material to a depth greater than the test depth L, N being greater than Nc and the fluence per pulse of the burst being equal to the characteristic total fluence $FT_{char}$ divided by the number Nc of heating and ablation pulses;

the number N of pulses of the burst is equal to N=Nc+Na where Na is a positive or negative integer number and Nc the number of heating and ablation pulses;

the number N of pulses of the burst is less than the number Nc of heating and ablation pulses, to ablate the material to a depth less than the test depth;

the integer number N of pulses is comprised between 10 and 10000; preferably greater than 50; for example comprised between 200 and 500, or between 300 and 500;

the ablation depth varies depending on the number N of pulses of the burst;

another characteristic total fluence $FT_{char2}$ is calculated as a function of the number N of pulses of the burst different from Nc, and N=Nc+Na where Na is a positive or negative integer number with $FT_{char2}=FT_{char}+Na \cdot FT_{char}/Nc$;

the operational total fluence is comprised between 2 times the other characteristic total fluence $FT_{char2}$ and 6 times the other characteristic total fluence $FT_{char2}$;

the material to be ablated is a semiconductor, metallic, dielectric, polymer, organic or composite material;

the transverse dimensions of the incident beam of pulses on the material to be ablated are less than or equal to 200 μm;

the pulses of a burst have a duration d comprised between 1 fs and less than 1 ps;

the burst of laser pulses has a wavelength comprised between 200 nm and 3 μm;

the material being silicon, the number N of pulses is comprised between 50 and 200, the characteristic fluence per constant pulse $F_{char}$ is about 0.018 $J/cm^2$, the intra-burst repetition frequency f is comprised between 0.88 GHz and 3.52 GHz, for a test depth L comprised between 2.2 μm and 4.4 μm;

the material being copper, the number N of pulses is comprised between 100 and 400, the characteristic fluence per constant pulse $F_{char}$ is approximately 0.03 $J/cm^2$, the intra-burst repetition frequency f being 1.76 GHz, for a test depth L comprised between 2.5 μm and 5.2 μm.

The number Na being fixed, another characteristic total fluence $FT_{char2}$ for the number of pulses N=Nc+Na is given by $FT_{char2}=FT_{char}+Na \cdot F_{char}$. A value of the other characteristic total fluence $FT_{char2}$ defining the ablation threshold for the burst of repetition rate f and number of pulses N=Nc+Na is thus obtained for a given material. The ablation depth obtained is therefore greater, and its estimated value is $L_2= \cdot (D \cdot N/f)$. According to the method, a total fluence close to $FT_{char2}$ is obtained experimentally if the test depth is fixed at $L=L_2$. N being fixed at N=Nc+Na, an ablation depth greater than $L_2$ is obtained by increasing the total fluence F beyond $FT_{char2}$ and according to the same rule stated for $FT_{opt}$, that is to say for FT comprised between 2 times the other characteristic total fluence $FT_{char2}$ and 6 times the other characteristic total fluence $FT_{char2}$.

According to a variant of the method, the total number of pulses N can be decreased from Nc with negative Na, so that N=Nc+Na. The effective ablation depth $L_2$ is therefore less than the test depth L, the procedure for optimising the total fluence FT remaining the same as described above.

Other particular and advantageous aspects of the laser ablation method are as follows.

The number N of pulses of the burst of laser pulses is greater than or equal to a number Nc of heating and ablation pulses, with Nc being defined by the equation $Nc=(L^2 \cdot f)/D$, where L represents a test depth and D represents a thermal diffusion coefficient of the material to be ablated, with Nc being greater than or equal to 10, and where the characteristic fluence per pulse is equal to $F_{char}=FT_{char}/Nc$.

The number N of pulses of the burst is comprised between 100 and 10000.

Each pulse of the burst has a fluence F one order of magnitude less than or equal to the ablation threshold fluence Fs1 of the material by a single laser pulse.

Each pulse of the burst has a fluence F less, by a factor comprised between one order of magnitude and two orders of magnitude, than the threshold fluence Fs1 for ablation by a single laser pulse.

The transverse dimensions of the incident beam of laser pulses on the material to be ablated are less than or equal to 200 μm.

A burst has a total energy comprised between 1 μJ and 20 mJ.

Particularly advantageously, the laser ablation method comprises applying a plurality of bursts at a repetition rate comprised between 10 kHz and 40 MHz.

The present disclosure also relates to a method of laser welding between parts of a determined material comprising the application of a burst of femtosecond laser pulses at an intra-burst repetition frequency f comprised between several hundred MHz and 100 GHz, the burst of femtosecond laser pulses comprising a number N of pulses, the number N of pulses of the burst of laser pulses being less than a number Nc of heating and ablation pulses, with Nc being defined by the equation $Nc=(L^2 \cdot f)/D$, where L represents a depth (heating or welding depth) and D represents a thermal diffusion coefficient of the material, where the burst of femtosecond laser pulses has a total fluence less than a characteristic total fluence $FT_{char}$ adapted to generate an ablation crater in the material and each pulse of the burst having a fluence F below an ablation threshold fluence Fs1 of the material by a single laser pulse.

Of course, the different features, variants and embodiments of the invention can be associated with each other in various combinations insofar as they are not incompatible or mutually exclusive.

Figure 2:
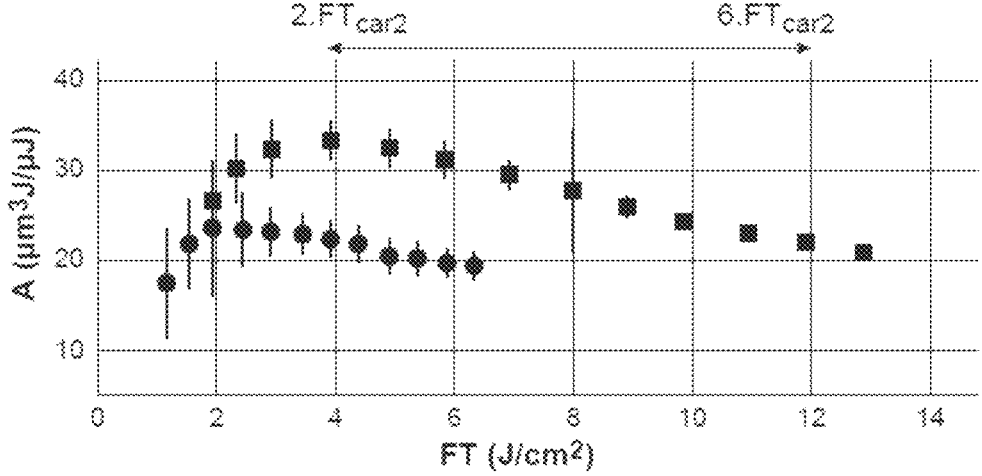
Figure 3:
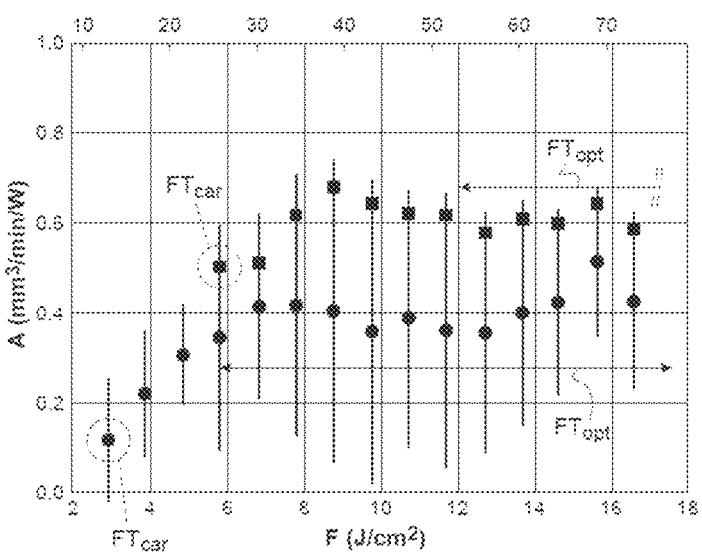
Figure 4:
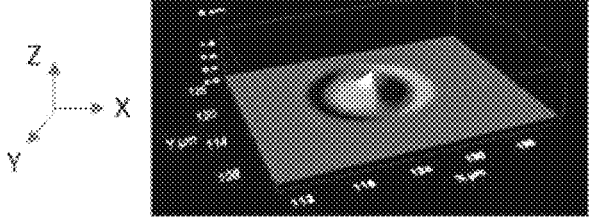
Figure 5:
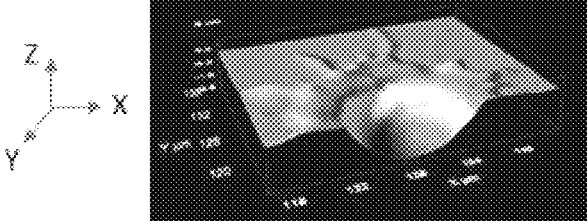
Figure 6:
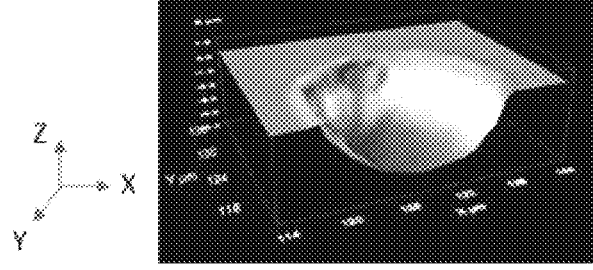
Figure 7A:
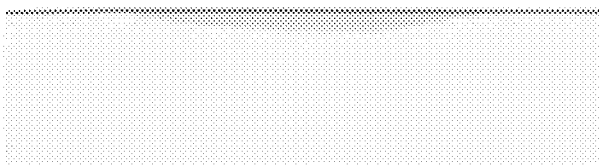
Figure 7B:
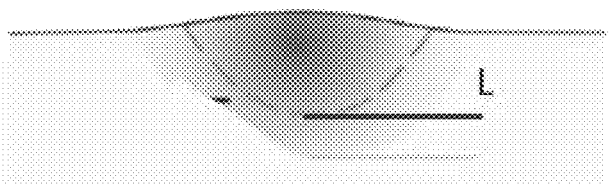
Figure 7C:
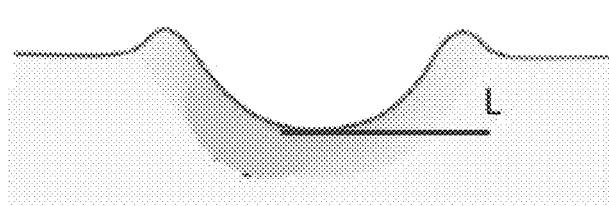
Figure 8:
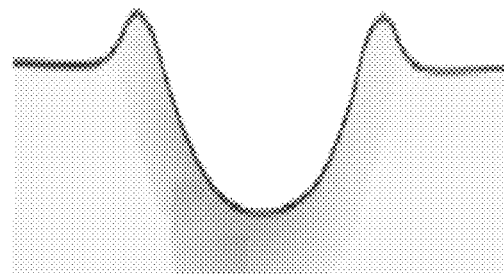

In addition, various other features of the invention emerge from the appended description made with reference to the drawings which illustrate non-limiting embodiments of the invention and where:

FIG. 1 is a graph showing an example of the time profile of a burst of femtosecond laser pulses with a repetition frequency of the order of GHz, FIG. 2 is a graph showing the evolution of the ablation efficiency (or volume ablated by total fluence) at the surface of a silicon material as a function of the total fluence FT per burst of pulses of GHz frequency, FIG. 3 is a graph showing the evolution of the ablation efficiency (or volume ablated by total fluence) at the surface of a copper material as a function of the total fluence FT per burst of pulses of GHz frequency, FIG. 4 is a representation of an example of a step for determining the characteristic total fluence of ablation of a silicon material for an integer number N of pulses such that N=Nc and here with a total fluence of the burst FT such that $FT<FT_{char}$, not inducing ablation, FIG. 5 is a representation of an example of another step for determining the characteristic total fluence of ablation of a silicon material for an integer number N of pulses such that N=Nc and here with a total fluence of the burst FT such that $FT \approx FT_{char}$, which induces ablation, FIG. 6 is a representation of an example of another step for determining the characteristic total fluence of ablation of a silicon material as a function of the integer number N of pulses such that N=Nc and with here a total fluence of the burst FT such that FT>FT$_{char}$, which induces a deeper ablation than in FIG. 5, FIGS. 7A-7C illustrate a schematic representation of the ablation mechanism involved during a high-repetition rate femtosecond laser ablation at the surface of a material, as a function of the total fluence of a burst of Nc femtosecond pulses, FIG. 8 is a schematic representation of a step of the ablation mechanism involved in a laser ablation at the surface of a material.

It should be noted that in these figures the structural and/or functional elements common to the different variants may have the same references.

The invention relates in particular to the field of pulses of a burst having a duration of the order of a femtosecond (less than a picosecond) and an intra-burst repetition frequency of the order of GHz.

The present disclosure proposes a method for determining the operational conditions of a laser ablation method for a given material comprising a step of determining a set of parameters for a repetition rate f of the burst of the order of GHz consisting of an integer number N of pulses of a burst of laser pulses, and a fluence F of each pulse of the burst. The total fluence of the burst FT seen by the material being equal to the product N·F. The repetition rate C of the bursts is another parameter of the laser source used.

The integer number N of pulses of a burst of laser pulses is at least greater than or equal to 10, particularly the number N of pulses is comprised between 10 and 800. In some applications, the number N of femtosecond pulses of a burst is greater than 20, or 50, comprised between 100 and 800, or between 200 and 600, or else between 300 and 400.

The duration T of a burst of N pulses at a repetition rate f is defined by T=N/f.

The pulses of a burst have a repetition frequency f comprised between 100 MHz and 100 GHz, and preferably comprised between 1 GHz and 100 GHz, or between 1 GHz and 10 GHz.

The total energy of a burst E$_b$ can be comprised between 1 µJ and 20 mJ depending on the laser used.

The burst of pulses has a repetition rate C comprised between 10 kHz and 40 MHz, the material is moving or not, the different bursts overlap or not. The repetition rate is however limited by the duration of the burst T so as to verify that the duration of the burst T is strictly less than the inverse of the repetition rate C.

According to the present disclosure, each pulse of a burst has a fluence F below an ablation threshold fluence Fs1 of the material by a single laser pulse having the same spatial, spectral and temporal properties as a pulse of said burst but transmitted on demand, and not part of a high rate burst.

The burst of laser pulses has a wavelength comprised between 200 nm and 3 µm.

For all the figures, a coordinate system XYZ is defined, where the direction of the axis Z is orthogonal to the surface of the material to be ablated and the laser beam propagates along the axis Z.

FIG. 1 is a graph showing an example of a burst comprising N pulses. Here, the integer number N of pulses of said burst is 100 and the pulses of said burst have a repetition frequency f equal to 0.88 GHz. Each pulse of the burst has a duration d less than or equal to 550 fs. Said burst has an energy E$_b$ which can vary from 1 µJ to 100 µJ, in this example the energy E$_b$ is equal to 33 µJ. Each burst of N pulses has a total duration T equal to 114 ns. The bursts are delivered by the laser source at a repetition rate C which can vary from 1 kHz to 200 kHz.

In another example, the integer number N of pulses of a burst of pulses is 50 and the pulses of said burst have a repetition frequency f equal to 0.88 GHz. Each pulse of the burst has a duration d less than or equal to 550 fs. Said burst has an energy E$_b$ which can vary from 1 µJ to 100 µJ and an adjustable repetition frequency C comprised between 1 kHz to 200 kHz and a total duration T equal to 57 ns.

In another example, the integer number N of pulses of a burst of pulses is 200 and the pulses of said burst have a repetition frequency f equal to 0.88 GHz. Each pulse of the burst has a duration d less than or equal to 550 fs. Said burst has an energy E$_b$ which can vary from 1 µJ to 100 µJ and an adjustable repetition frequency C comprised between 1 kHz to 200 kHz and a total duration T equal to 228 ns.

The use of a machining device allows the management of the addressing of the bursts on a sample either by a spatial superposition of the bursts in a static case, or by a complete or partial spatial shift of the pulses in the case of movement of the sample or laser beam.

Consider a material to be ablated having a given thermal diffusion coefficient D expressed in cm²/s.

Without being bound by theory, according to the present method, the integer number N of femtosecond pulses of repetition frequency of the order of GHz for a burst is equal to the sum of an integer number Nc of pulses allowing heating and ablation over a depth L$_{th}$ and an integer number Na of complementary pulses, with L$_{th}$ corresponding to the thermal depth length associated with the material for the repetition rate f.

In a first step, the number Nc of heating and ablation pulses is determined corresponding to the number of femtosecond pulses for a burst of repetition rate f which is necessary to heat the material to be ablated over a test depth L given as the starting point of the optimisation, so as to modify the value of the threshold fluence Fs1 until another threshold fluence Fs2 below the threshold fluence Fs1 is reached. The total fluence FT of the burst is defined so that the fluence F per pulse is less than the threshold fluence Fs1. The number Nc is defined by the equation Nc=(L²·f)/D. In other words, according to the present disclosure, in the burst of femtosecond pulses, the fluence F per pulse is less than the threshold fluence Fs1 and greater than or equal to the other threshold fluence Fs2.

The number Nc corresponds to the number of pulses of the burst allowing the heating of the material to be ablated along the axis Z over a depth L. The number Nc represents a lower limit of the number of pulses N for the ablation at the repetition rate f of the pulses of a burst in the vicinity of the depth L. In other words, Nc represents the number of pulses where an ablation crater of depth close to L appears on the surface of the material.

The test depth L is obtained for a characteristic total fluence value FT$_{char}$ of a burst of pulses of repetition rate f. This characteristic total fluence FT$_{char}$ corresponds to the total fluence of the minimum burst allowing to observe an ablation crater at the surface of the material. The characteristic total fluence FT$_{char}$ of a burst of pulses divided by the number of pulses N is generally different from the fluence Fs1 characterising the ablation threshold for a single pulse and is less than the fluence Fs1, that is to say FT$_{char}$/N<Fs1.

In practice, for a given material of known thermal diffusion D, at a given repetition rate f and for an objective of depth of ablation of the material L, the number of pulses Nc is calculated as a function of D, f and L. Once the number Nc of pulses has been estimated, the characteristic total fluence $FT_{char}$ can be determined experimentally as the minimum fluence of a burst of Nc pulses allowing the formation of a crater of depth L.

In a second step, the operational total fluence of the burst $FT_{opt}$ is then determined for N=Nc corresponding to an optimum ablation efficiency which allows to optimise the ablation depth or the ablation volume while maintaining an ablation efficiency close to its maximum. $FT_{char}$ is estimated to be equivalent to a threshold fluence for GHz burst ablation. It is generally accepted that ablation efficiency can be estimated by knowing the ablation threshold fluence $FT_{th}$. The ablation depth varies in $Ln(FT/FT_{th})$ and the ablation volume in $Ln^2(FT/FT_{th})$. The specific quantities $Ln(F/FT_{th})/FT$ and $Ln^2(FT/FT_{th})/FT$ allow to estimate the ablation efficiency as a function of the fluence per pulse F and have an optimal value, close to $FT_{th}$, then saturate. Therefore, an operational total fluence $FT_{opt}$ of the burst of pulses is selected for N=Nc in the interval $2 \cdot FT_{char} < FT_{opt} < 6 \cdot FT_{char}$.

An example of the value of the operational total fluence of the burst $FT_{opt}$ is close to the characteristic total fluence value $FT_{char}$ and can be estimated by multiplying the characteristic total fluence $FT_{char}$ by two, that is to say $FT_{opt} = 2 FT_{char}$.

The heating/ablation phase is carried out under optimal conditions for a characteristic fluence $F_{char}$ per pulse close to the ablation threshold fluence Fs2. This threshold fluence Fs2 is not known and is difficult to be measured. According to the invention, it is approximated that the characteristic fluence $F_{char}$ per pulse is $F_{char} = FT_{char}/Nc$. This value remains approximately constant for each pair ($FT_{char}$, Nc) corresponding to a threshold for obtaining a crater at the pulse rate f for a given material.

A third optional step of the present method consists in determining the number N of pulses for an ablation depth greater than L. When the burst was optimised for a total fluence FT equal to $FT_{char}$, the material was heated at the surface of the crater and the ablation threshold for a single pulse went from a known value for the material Fs1 to a lower value Fs2, which is unknown and difficult to measure.

It is judicious to increase the number N of pulses to obtain a greater ablation depth, avoiding the phenomenon of saturation appearing by the increase in fluence alone. It is chosen to increase the number N of pulses by a value Na, that is to say N=Nc+Na, while maintaining the same fluence per pulse $F_{char} = FT_{char}/Nc$. The characteristic fluence per pulse $F_{char}$ remains identical for all the pairs ($FT_{char}$, Nc) for the same material.

This results in another value of the total fluence FT equal to $FT_{char} + Na \cdot F$ that is to say equal to $FT_{char}(1+Na/Nc)$. For example, if we take Na=Nc, $FT=2 \cdot FT_{char}$ and N=2·Nc. More particularly, for N=Nc=50, a characteristic total fluence $FT_{char} = 0.96$ J/cm² is obtained in the case of a silicon material. By adding Na complementary pulses, a number N of pulses equal to 2·Nc or 100 is obtained, and the value of the other characteristic total fluence $FT_{char2}$ is equal to $2 \cdot FT_{char}$ or 1.9 J/cm².

To optimise again the total fluence FT and obtain the other value of the operational total fluence of the burst $FT_{opt2}$ greater than $FT_{char2}$, the procedure described above is repeated and it is obtained that the operational total fluence of the burst $FT_{opt2}$ is comprised within the following interval $2 \cdot FT_{char2} < FT_{opt2} < 6 \cdot FT_{char2}$.

FIG. 2 shows the evolution of the ablation efficiency (or volume ablated by total fluence) at the surface of a silicon material as a function of the total fluence FT per burst of pulses of GHz frequency. In this example, the number N of pulses is equal to 50 (round dots) and 100 (square dots), and the repetition frequency f is 0.88 GHz.

On the graph, it is observed that the efficiency of ablation of the surface of the material has an ablation threshold for a total fluence value FT corresponding to the characteristic total fluence $FT_{char}$ allowing to observe an ablation crater at the surface of the material. Then the ablation efficiency increases as the total fluence FT increases until reaching a maximum ablation efficiency value corresponding to the total fluence of the burst $FT_{opt}$. The operational total fluence of the burst $FT_{opt}$ extends within a range from $2 \cdot FT_{char}$ to $6 \cdot FT_{char}$ and this range corresponds to the optimum ablation efficiency. Once maximum ablation efficiency is reached, the ablation efficiency decreases as the total fluence FT continues to increase. In this case, the ablation depth or the ablated volume continues to increase but the quality deteriorates by increasing the amount of energy not needed for the ablation.

Here, for N=Nc=50 (round points) a minimum ablation efficiency equal to approximately 18 μm³/μJ for a characteristic total fluence $FT_{char}$ equal to 0.96 J/cm² is obtained. The maximum ablation efficiency is equal to approximately 25 μm³/μJ for an operational total fluence of the burst $FT_{opt}$ comprised between approximately 2 J/cm² and 6 J/cm².

For N=2Nc=100 (square points), a minimum ablation efficiency equal to approximately 27 μm³/μJ for a characteristic total fluence $FT_{char2}$ equal to $2FT_{char}$ or 1.9 J/cm² is obtained. The maximum ablation efficiency is equal to approximately 34 μm³/μJ for an operational total fluence of the burst $FT_{opt}$ comprised between approximately 4 J/cm² and 12 J/cm².

It is verified that the fluence per pulse $F_{char}$ is almost constant. It is also verified that the ablation efficiency is optimal between $2 \cdot FT_{char2}$ and $6 \cdot FT_{char2}$.

FIG. 3 shows the evolution of the ablation efficiency (or volume ablated by total fluence) at the surface of a copper material as a function of the total fluence FT per burst of pulses of GHz frequency. In this example, the number N of pulses is equal to 100 (round dots) and 200 (square dots), and the repetition frequency f is 1.76 GHz.

On the graph, for N=100 (round points) a minimum ablation efficiency equal to approximately 0.1 mm³/min/W for a characteristic total fluence $FT_{char}$ equal to approximately 3 J/cm² is obtained. The maximum ablation efficiency is approximately 0.5 mm³/min/W for an operational total fluence of the burst $FT_{opt}$ comprised between approximately 6 J/cm² and 18 J/cm².

On the graph, for N=200 (square points) a minimum ablation efficiency equal to approximately 0.5 mm³/min/W for a characteristic total fluence $FT_{char}$ equal to approximately 6 J/cm² is obtained. The maximum ablation efficiency is approximately 0.7 mm³/min/W for an operational total fluence of the burst $FT_{opt}$ comprised between approximately 12 J/cm² and 36 J/cm².

FIGS. 4, 5 and 6 show an example of the evolution of the depth of ablation of a silicon material as a function of the integer number N of pulses and of the total fluence of the burst FT.

In each example illustrated in FIGS. 4, 5, and 6, the repetition frequency C is 100 kHz, the repetition frequency f is 0.88 GHz, the period between two successive bursts is 10 μs, the total duration T of a burst is 57 ns, the duration d of the pulses of a burst is 550 fs.

FIG. 4 shows the ablation profile at the surface of the silicon material for a number N of pulses equal to Nc and for a total fluence FT of the burst less than the characteristic total fluence $FT_{char}$. Under these conditions, the image obtained by optical profilometry shows the formation of a bump at the surface of the material: the material is heated but cannot be ablated. In this example, the number N of pulses is 100, and the total fluence FT is equal to 1.7 J/cm².

FIG. 5 shows the ablation profile at the surface of the silicon material for a number N of pulses equal to Nc and for a total fluence FT of the burst close to the characteristic total fluence $FT_{char}$. Under these conditions, the image obtained by optical profilometry shows the formation of a crater at the surface of the material having a minimum depth. In this example, the number N of pulses is 100, and the total fluence FT is equal to 1.8 J/cm². It is observed that the ablation depth generated by a burst of 100 pulses is approximately 2.6 μm.

FIG. 6 shows the ablation profile at the surface of the silicon material for a number N of pulses equal to Nc and for a total fluence FT of the burst greater than the characteristic total fluence $FT_{char}$. Under these conditions, the image obtained by optical profilometry shows an increase in the depth of ablation of the previously formed crater. The depth of the crater increases as the total fluence FT increases, with optimum efficiency. In this example, the number N of pulses is 100 and the total fluence FT is 5.8 J/cm². It is observed that the ablation depth generated by a burst of 100 pulses is approximately 4.5 μm.

It is observed that the ablation depth increases as the number N of pulses increases for N>Nc and FT>$FT_{char}$. This technical effect is by no means derived from teaching in the technical field where the ablation for femtosecond pulses is very controversial. The ablation depth for a burst comprising 50 pulses is reduced from 3.5 μm to 7.5 μm for a burst comprising 200 pulses, the total fluence FT of the burst being 5.8 J/cm² in both cases.

One possible interpretation is that the present method is based on the coupling of a phenomenon of heat accumulation and very efficient ablation at the surface of the material which differs from the mechanism involved for the ablation by a single pulse of duration μs, or ns.

The present method allows, for example, to determine the operational conditions for carrying out laser ablation by a burst of femtosecond pulses of repetition frequency of the order of GHz at the surface of a silicon material. In Table 1, the operational conditions for performing laser ablation by a burst of femtosecond pulses of repetition frequency of the order of GHz at the surface of a silicon material are listed in the form of examples indexed from A to G The thermal diffusion coefficient D of silicon at room temperature is equal to 0.86 cm²/s.

TABLE 1

| | f (GHz) | L (μm) | calculated Nc | $FT_{char}$ (J/cm²) | $F_{char}$ (J/cm²) | $L_m$ (μm) |
|---|---|---|---|---|---|---|
| A | 0.88 | 2.2 | 50 | 0.96 | 0.019 | 1.45 |
| B | 0.88 | 3.1 | 100 | 1.8 | 0.018 | 2.6 |
| C | 0.88 | 4.4 | 200 | 3.3 | 0.017 | 4 |
| D | 1.76 | 1.6 | 50 | | | |
| E | 1.76 | 2.2 | 100 | | | |
| F | 1.76 | 3.1 | 200 | | | |
| G | 3.52 | 2.2 | 198 | 1.9 | | |

Table 1 lists the operational conditions for carrying out laser ablation on a silicon material by a burst of femtosecond pulses of repetition frequency of the order of GHz. In this table $L_m$ corresponds to the experimental value of the test length L measured for FT=$FT_{char}$ and N=Nc.

The threshold fluence Fs1 for the ablation by one pulse for silicon is equal to 0.46 J/cm². In examples A to G, the fluence per pulse for a burst is significantly less than the threshold fluence Fs1 for ablation by one pulse for the silicon material. In other words, the fluence F per femtosecond pulse of the burst is approximately Fs1/25. The fluence F per femtosecond pulse of the burst is more than one order of magnitude less than the threshold Fs1 ablation fluence for a single pulse.

TABLE 2

| | f (GHz) | L (μm) | Nc | $FT_{char}$ (J/cm²) | $F_{char}$ (J/cm²) | $FT_{opt}$ (J/cm²) | 2Nc | $2FT_{char}$ (J/cm²) |
|---|---|---|---|---|---|---|---|---|
| H | 1.76 | 2.55 | 100 | 3 | 0.03 | $6 < FT_{opt} < 18$ | 200 | 6 |
| I | 1.76 | 3.62 | 200 | 6 | 0.03 | $12 < FT_{opt} < 36$ | 400 | 12 |
| J | 1.76 | 5.12 | 400 | 14 | 0.035 | $28 < FT_{opt} < 84$ | 800 | 28 |

Table 2 lists the operational conditions for performing laser ablation on a copper material by a burst of femtosecond pulses of repetition frequency of the order of GHz.

The threshold fluence Fs1 for ablation by one pulse for copper is 1.7 J/cm². The thermal diffusion coefficient D of copper at room temperature is equal to 1.15 cm²/s. In other words, the fluence F per femtosecond pulse of the burst is equal to approximately Fs1/50. Again, the burst fluence F per femtosecond pulse is more than one order of magnitude less than the ablation threshold fluence Fs1 for a single pulse. The fluence F per pulse is a factor comprised between one order of magnitude and two orders of magnitude less than the threshold fluence Fs1 of ablation for a single pulse.

For all examples A to J, the transverse dimensions of the focused incident beam of pulses on the material to be ablated are 24 μm. In practice, the transverse dimensions of the focused incident beam of pulses on the material to be ablated are less than or equal to 200 μm.

The repetition frequency C of a burst can be comprised between 1 kHz and 200 kHz. The burst of pulses, for example, has a duration comprised between 1 ns and a few hundred ns. The pulses of a burst have, for example, a duration comprised between 1 fs and less than 1 ps. The integer number N of pulses can be comprised between 10 and 400 or more. The value of the fluence F of each pulse of the burst is for example comprised between 0.001 J/cm² and 1 J/cm². The material to be ablated can be selected from a semiconductor, metallic, dielectric, polymer, organic or composite material.

FIGS. 7A to 7C show the different steps of a laser ablation method by a burst of femtosecond pulses of repetition frequency of the order of GHz at the surface of a material, as a function of the total fluence of a burst of Nc femtosecond pulses.

FIG. 7A illustrates the surface of the material receiving a number Nc of heating and ablation pulses. Heating the material surface starts and the total fluence FT is much lower than the characteristic total fluence $FT_{char}$. In this illustrative example, N=Nc and FT<<$FT_{char}$.

FIG. 7B illustrates the surface of the material having received a number Nc of heating and ablation pulses with a total fluence FT higher than in the case shown in the diagram above. The surface of the material is heated over a length approaching the test length L and the total fluence FT is less than the characteristic total fluence $FT_{char}$. In this illustrative example, N=Nc and FT<$FT_{char}$.

FIG. 7C illustrates the surface of the material receiving a number Nc of heating and ablation pulses. The material ablation threshold is reached, the material ablation is possible and the total fluence FT is equal to the characteristic total fluence $FT_{char}$. In this illustrative example, N=Nc and $FT=FT_{char}$. The ablation depth obtained is close to the test length L.

FIG. 8 shows the step of adding the number Na of complementary laser pulses by a burst of femtosecond pulses of repetition frequency of the order of GHz to the surface of a material. The threshold is then reached for the total fluence $FT=FT_{char2}$. The ablation depth is greater than the test depth L.

The diagram of FIG. 8 illustrates the surface of the material receiving a number of pulses N equal to the number Nc+Na. When N is equal to Nc+Na, the ablation depth increases as a function of Na and the total fluence FT is equal to the other characteristic total fluence $FT_{char2}$, that is to say $FT_{char}$+Na. $FT_{char}$/Nc or (Nc+Na). $(F_{char}$/Nc). In this illustrative example, N=Nc+Na and $FT=FT_{char2}$.

An optimised ablation can be obtained by settings combining the intra-burst repetition frequency f in the GHz range, the number of pulses N per burst and the total energy of the pulses. In examples A and B of Table 1 also shown in FIG. 2, the burst having a number of pulses N equal to 100 pulses (example B, square points) allowed to achieve an ablation efficiency greater than the burst having a number of pulses N equal to 50 pulses (example A, round dots), for the same intra-burst repetition frequency f equal to 0.88 GHz. This example shows that once the ablation threshold has been reached, for the same intra-burst repetition frequency, the increase in the total energy of the burst and therefore in the total fluence of the burst contributes to a more efficient ablation process. Since the phenomenon is limited by a saturation of the ablation efficiency for energies that are too high, the maximum fluence depends on each material and is for example of the order of 50 $J/cm^2$.

The method for determining the operational conditions of a laser ablation method by a burst of femtosecond pulses of repetition frequency of the order of GHz at the surface of a material allows to control the number of pulses N and the energy of the burst $E_b$.

The present method is defined for materials having a known thermal diffusivity D.

Table 3 gives examples of the value of the thermal diffusion coefficient D for different materials.

TABLE 3

| Materials | Thermal diffusion coefficient D ($cm^2/s$ at 22° C.) |
|---|---|
| Aluminium | 0.94 |
| Copper | 1.15 |
| Iron | 0.19 |
| Nickel | 0.16 |
| Silver | 1.61 |
| Tin | 0.39 |
| Zinc | 0.40 |
| Magnesium | 0.54 |
| Steel | 0.14 |
| Steel | 0.096 |
| Titanium | 0.019 |

The present method requires that the energy $E_b$ per burst is defined so as to obtain a fluence F of each pulse of the burst below the ablation threshold fluence Fs1 of the considered material by a single pulse.

The present method advantageously allows to adjust the ablation depth obtained as a function of the number of pulses N of the burst at fixed fluence F per pulse.

The present method advantageously allows to adjust the ablation depth obtained as a function of the total fluence of the burst for a fixed number of pulses N.

For each material and for a given ablation depth, it is possible to determine the number N of pulses corresponding to an ablation threshold as a function of the total fluence of the burst.

Unlike the negative a priori in the technical field of the ablation of material by femtosecond pulses of intra-burst repetition frequency f in the GHz range, it is possible under precise operational conditions to obtain high ablation efficiencies and good machining qualities.

For example, for a silicon material, the number N of pulses is comprised between 50 and 200, the fluence per characteristic pulse of a GHz ablation threshold $F_{char}$ is approximately 0.018 $J/cm^2$, the frequency of intra-burst repetition is comprised between 0.88 GHz and 3.52 GHz for a test depth L comprised between 2.2 μm and 4.4 μm.

For example, for a copper material, the number N of pulses is comprised between 100 and 400, the fluence per characteristic pulse of a GHz ablation threshold $F_{char}$ is approximately 0.03 $J/cm^2$, the intra-burst repetition frequency being equal to 1.76 GHz for a test depth L comprised between 2.5 μm and 5.2 μm.

The laser ablation method of the present disclosure is particularly applicable to materials such as glass or transparent ceramics. These materials are transparent, a surface absorption takes place over a depth corresponding to the Rayleigh length. In addition, these materials are brittle. This means that any crack in the surface or in volume can be easily developed and lead to severe damage. Finally, the number of pulses in the burst is preferably limited to the minimum necessary. In these circumstances, the formula for Nc does not apply, only the condition on the minimum number of pulses of the burst N greater than 10 applies. In addition, in these materials, the thermal diffusion should be reduced. One of the methods to reduce thermal diffusion is to use a laser source wavelength beyond the transparency range of the given glass substrate, for example in the UV or deep UV (DUV) range.

The laser ablation method of the present disclosure is advantageously also applicable to the ablation of low surface roughness glass. In this case, the light is trapped at the surface of the irregularities and diffused below the surface. Surface roughness induces optical degradation. The surface roughness can be generated by means of a laser, the pulses of which are controlled spatially so as to obtain these roughnesses. Surface roughness can be induced by mechanical means, for example sandblasting. The requirements for the mean roughness are of the order of a surface roughness between 400 nm and 10 μm ("RMS" (Root mean square slope) roughness>0.25).

Knowing the conditions for obtaining ablation, the present disclosure also allows to determine the operational conditions for carrying out welding without loss of material between parts of the same material. The present disclosure therefore also applies to a laser welding method, based on the application of a burst of femtosecond laser pulses at an intra-burst repetition frequency f comprised between several hundred MHz and 100 GHz, wherein the burst of femtosecond laser pulses comprises a number N of pulses, the number N of pulses of the burst of laser pulses being less than the number Nc of heating and ablation pulses, with Nc being defined by the equation $Nc=(L^2 \cdot f)/D$, where L represents a test depth and D represents a thermal diffusion coefficient of the material, and where the burst of femtosecond laser pulses has a total fluence less than a characteristic total fluence $FT_{char}$ adapted to generate an ablation crater in the material and each pulse of the burst having a fluence F below an ablation threshold fluence Fs1 of the material by a single laser pulse. In some applications, the number N of pulses of the burst of laser pulses is greater than or equal to 10.

The invention claimed is:

1. A method of laser ablation of a determined material comprising the application of a burst of femtosecond laser pulses at an intra-burst repetition frequency f comprised between several hundred MHz and 100 GHz, the burst of femtosecond laser pulses comprising a number N of pulses greater than or equal to 10, the burst of femtosecond laser pulses having a total fluence greater than or equal to a characteristic total fluence $FT_{char}$ adapted to generate an ablation crater in the material and each pulse of the burst having a fluence F less than or equal to an ablation threshold fluence Fs1 of the material by a single laser pulse, and wherein the number N of pulses of the burst of femtosecond laser pulses is greater than or equal to a number Nc of heating and ablation pulses, with Nc being defined by the equation $Nc=(L^2 \cdot f)/D$, where L represents an objective of depth of ablation of the material and D represents a thermal diffusion coefficient of the material to be ablated, with Nc being greater than or equal to 10, and where a characteristic fluence per pulse is equal to $F_{char}=FT_{char}/Nc$, and the method comprising a determination of the value of the characteristic total fluence $FT_{char}$ of the burst for the number of pulses Nc, $FT_{char}$ being the minimum total fluence for obtaining a crater at the surface of the material.

2. The laser ablation method according to claim 1 wherein the number N of pulses of the burst is comprised between 100 and 10000.

3. The laser ablation method according to claim 2 wherein each pulse of the burst has the fluence F one order of magnitude less than or equal to the ablation threshold fluence Fs1 of the material by the single laser pulse.

4. The laser ablation method according to claim 2 wherein transverse dimensions of an incident beam of the laser pulses on the material to be ablated are less than or equal to 200 μm.

5. The laser ablation method according to claim 2 wherein the burst has a total energy comprised between 1 μJ and 20 mJ.

6. The laser ablation method according to claim 2 comprising applying a plurality of bursts at a repetition rate comprised between 10 kHz and 40 MHz.

7. The laser ablation method according to claim 1 wherein each pulse of the burst has the fluence F one order of magnitude less than or equal to the ablation threshold fluence Fs1 of the material by the single laser pulse.

8. The laser ablation method according to claim 7 wherein each pulse of the burst has the fluence F less, by a factor comprised between one order of magnitude and two orders of magnitude, than the threshold fluence Fs1 for ablation by the single laser pulse.

9. The laser ablation method according to claim 1 wherein transverse dimensions of an incident beam of the laser pulses on the material to be ablated are less than or equal to 200 μm.

10. The laser ablation method according to claim 1 wherein the burst has a total energy comprised between 1 μJ and 20 mJ.

11. The laser ablation method according to claim 1 comprising applying a plurality of bursts at a repetition rate comprised between 10 kHz and 40 MHz.

* * * * *